United States Patent [19]

Sakane

[11] 4,049,589
[45] Sept. 20, 1977

[54] POROUS FILMS OF POLYTETRAFLUOROETHYLENE AND PROCESS FOR PRODUCING SAID FILMS

[75] Inventors: Isamu Sakane, Osaka, Japan

[73] Assignee: Sumitomo Electric Industries, Ltd., Osaka, Japan

[21] Appl. No.: 620,077

[22] Filed: Sept. 30, 1975

Related U.S. Application Data

[63] Continuation of Ser. No. 452,575, March 19, 1974, abandoned.

[30] Foreign Application Priority Data

Mar. 19, 1973 Japan .................................. 48-30832
Mar. 19, 1973 Japan .................................. 48-30833
Mar. 19, 1973 Japan .................................. 48-30834

[51] Int. Cl.² .............................................. C08J 9/24
[52] U.S. Cl. .......................... 260/2.5 M; 260/2.5 R; 260/33.8 F; 264/41; 264/49; 264/119; 264/126; 264/127; 264/210 R; 264/288; 264/289; 264/344; 264/345

[58] Field of Search ............... 264/126, 127, 288, 1, 264/289, 345, 125, 120, 210 R, 39, 344, 41, 49, 119; 237/14; 260/2.5 M, 2.5 R, 2.5 HA, 33.8 F; 526/250

[56] References Cited

U.S. PATENT DOCUMENTS

| | | | |
|---|---|---|---|
| 2,578,522 | 12/1951 | Edgar | 264/127 |
| 2,642,625 | 6/1953 | Peck | 264/127 |
| 2,685,707 | 8/1954 | Liewellyn et al. | 264/174 |
| 2,852,811 | 9/1958 | Petriello | 264/39 |
| 3,281,511 | 10/1966 | Goldsmith | 264/125 |
| 3,315,020 | 4/1967 | Gore | 264/120 |
| 3,556,161 | 1/1971 | Roberts | 264/127 |
| 3,813,461 | 5/1974 | Murayama et al. | 264/127 |
| 3,953,566 | 4/1976 | Gore | 264/210 R |

Primary Examiner—Jeffery R. Thurlow
Attorney, Agent, or Firm—Sughrue, Rothwell, Mion, Zinn and Macpeak

[57] ABSTRACT

A porous film of polytetrafluoroethylene having an accurately controlled pore diameter and a superior pore diameter distribution, and a process for preparing the film.

10 Claims, 1 Drawing Figure

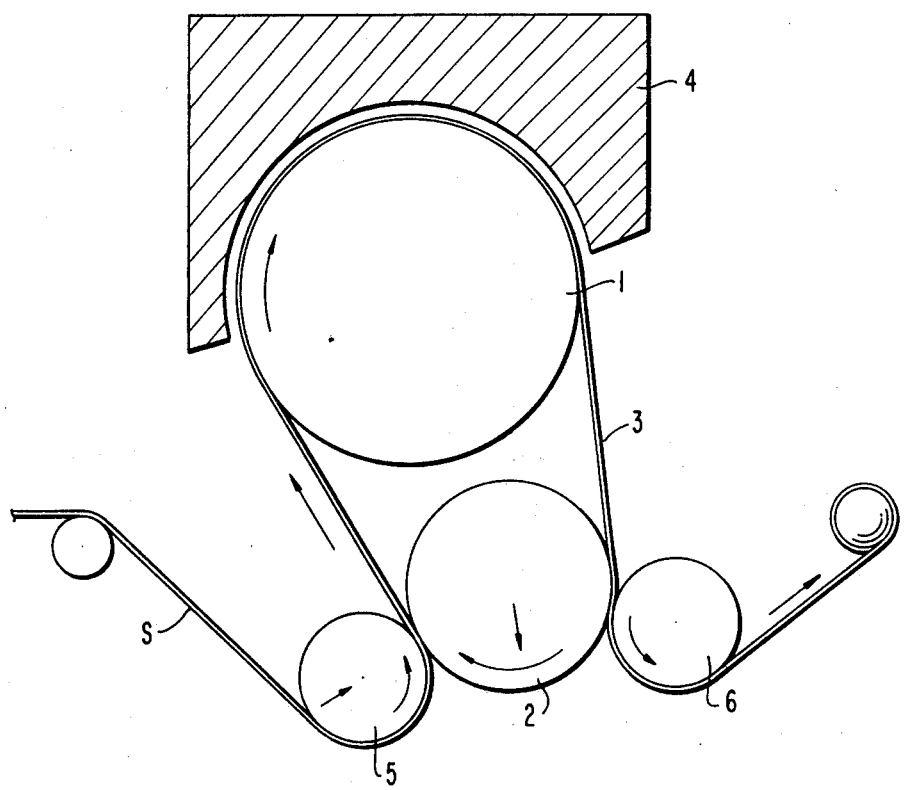

4,049,589

POROUS FILMS OF POLYTETRAFLUOROETHYLENE AND PROCESS FOR PRODUCING SAID FILMS

This is a continuation of application Ser. No. 452,575, filed Mar. 19, 1974, now abandoned.

BACKGROUND OF THE INVENTION

1. Field of the Invention

This invention relates to a porous film of polytetrafluoroethylene having an accurately controlled pore diameter and a superior pore diameter distribution, and to a process for preparing the film.

2. Description of the Prior Art

As is well known, polytetrafluoroethylene resins have superior chemical resistance, heat resistance and electric insulation and also self-lubricating properties and non-tackiness, and find a wide range of utility both in industrial fields and in every day life. On the other hand, these superior properties are indicative of the difficulty of processing these resins. Accordingly, extensive research and development work has been conducted. One noteworthy method that emerged from such work involves fabricating an unsintered tetrafluoroethylene resin mixture containing a liquid lubricant by extrusion or rolling, etc., and then while being stretched in at least one direction in the unsintered state, sintering the mixture to at least about 327° C to form a porous structure. This method can provide a porous film having a relatively uniform porous structure and superior strength, but is insufficient for obtaining an accurate control of the pore diameter and the desired pore diameter distribution.

SUMMARY OF THE INVENTION

We have been engaged in work directed to the improvement of the above method with the elimination of the above defects, and finally found that under certain stretching conditions, a porous film which has superior pore diameter distribution characteristics and which is especially suitable for use as a membrane filter, an electrolytic diaphragm or a diaphragm for fuel cells, can be obtained.

Accordingly, it is an object of this invention to provide a porous sintered film of polytetrafluoroethylene having a pore diameter accurately controlled to not more than 5 microns.

Another object of this invention is to provide a porous film of polytetrafluoroethylene having a pore diameter distribution approximating the normal distribution with the $+3\delta$ diameter being not more than two times the mean diameter.

Still another object of this invention is to provide a process for continuously and very efficiently sintering an unsintered sheet of polytetrafluoroethylene, with the elimination of the defects of the conventional method.

The above objects of this invention can be achieved by a process for preparing a porous film of polytetrafluoroethylene which comprises fabricating an unsintered polytetrafluoroethylene mixture containing a liquid lubricant by extrusion, by rolling or by extrusion and rolling, and then stretching the film in at least one direction in the unsintered state or heating the film to a temperature of at least about 327° C while the film is being stretched in at least one direction, wherein the stretching is carried out while maintaining the following conditions:

the temperature of the sheet during stretching at 20 to 100° C.

the absolute speed of the sheet at 1 cm/min to 20 m/min, the stretch ratio is between 10% and 90%, where stretch ratio is defined as $(V_2/V_1 - 1) \times 100\%$, $V_2$: speed of the take up roll, $V_1$: speed of the supply roll, and the distance between the stretch rolls at 0.05 to 500 mm.

BRIEF DESCRIPTION OF THE ACCOMPANYING DRAWING

The only FIGURE shows one embodiment of an apparatus suitable for performing the heating and sintering step of this invention.

DETAILED DESCRIPTION OF THE INVENTION

The first step of obtaining a porous structure by the process of this invention is to obtain an unsintered fabricated aritcle using a paste extrusion method as disclosed in U.S. Pat. No. 2,685,707, a calender rolling method as disclosed in U.S. Pat. No. 2,578,522 or both of these methods. These methods are conventionally known as methods for preparing a pipe, or a sheet, especially an unsintered sheet.

The unsintered tetrafluoroethylene resin used for preparing the porous structure of this invention is suitably one obtained by coagulation from an emulsion or dispersion. The molecular weight of the polytetrafluoroethylene which is suitable can vary and is essentially not of concern. It is sufficient if the polytetrafluoroethylene has a molecular weight suitable for producing a paste extrusion and rolling. From the above standpoint, the molecular weight thus generally can range from 700,000 to 6,000,000, preferably 1,000,000 to 3,000,000. The mixing of a liquid lubricant with the tetrafluoroethylene resin can be conveniently carried out by adding the lubricant to a resin obtained by coagulation from an emulsion or dispersion and then stirring the resulting mixture. It is also possible to add the liquid lubricant to an emulsion or dispersion, and then the mixture is coagulated. Alternatively, this can be accomplished using a combination of these two methods.

A substance capable of wetting the surface of the resin and being removed by evaporation or extraction, etc. at a temperature below the decomposition temperature of the resin can be used in this invention as in the case of conventional paste extrusion methods. Examples of liquid lubricants include hydrocarbon oils such as solvent naphtha or white oil, aromatic hydrocarbons such as toluol or xylol, alcohols, ketones, esters, silicone oils, fluorochlorocarbon oils, solutions of polymers such as polyisobutylene or polyisoprene in one of the above hydrocarbon oils, aromatic hydrocarbons, alcohols and ketones as a solvent, mixtures of two or more of these solvents, aqueous surfactant solutions, or aqueous solutions.

The amount of the liquid lubricant can be appropriately changed depending on the method of fabrication, the size of the fabricated article, for example, the thickness of the sheet, or the presence or absence of additives other than the tetrafluoroethylene resin, such as an inorganic filler. Usually, 100 to 15 parts by volume of the liquid lubricant are used per 100 parts by volume of the resin. Best results are obtained when the amount of the liquid lubricant is 65 to 25 parts by volume per 100 parts by volume of the resin.

The fabricating mixture can further contain other additives depending on the end-use purpose. For example, the mixture can contain a pigment for coloring; an inorganic filler such as carbon black, graphite, silica powder, asbestos powder, glass powder, glass fibers, silicates, or carbonates, metal powders, metal oxide powders, or metal sulfide powders for increasing strength against compression, improving abrasion resistance, preventing cold flow, and facilitating the formation of pores; or a substance capable of being removed or decomposed by heating, extraction, or dissolving, etc., such as ammonium chloride, sodium chloride, other plastics, or rubbers as powders or solutions for facilitating the formation of a porous structure. Such additives can be incorporated before or after coagulating the tetrafluoroethylene resin from the emulsion or dispersion.

Then, the unsintered polytetrafluoroethylene mixture containing the liquid lubricant is fabricated in a step comprising extrusion or rolling or both extrusion and rolling. The fabrication is carried out at a temperature of not higher than the sintering temperature of the polytetrafluoroethylene, that is, at a temperature of not more than about 327° C, generally at 20° to 150° C, preferably 30° C to 60° C. Commonly the step is conducted at room temperture.

The unsintered polytetrafluoroethylene tends to be of a fine fibrous structure under the influence of a shearing force which it undergoes when being extruded from a die in the extruding step, or when being rolled with rolls, or when being vigorously stirred. A tetrafluoroethylene resin containing the liquid lubricant is more easily fiberized. This fiberization is one of the important features for obtaining the porous structure in accordance with this invention. Accordingly, the polytetrafluoroethylene mixture must be molded by extrusion or rolling or by both extrusion and rolling.

Some specific examples of fabrication are shown below.

1. A rod, tube, strip of sheet is molded by extrusion. This can be accomplished by a known method using a ram-type extruder. Generally, the resin mixture is compression molded prior to feeding to the extruder in order to render the molded article uniform. The resin mixture which has been fiberized to some extent by extrusion, rolling or stirring in a fluid can further be extruded to form a molded article.

2. A sheet or film is molded by rolling. The resin mixture containing the lubricant, either in the form of a powder or in a pre-compressed state, is passed between rolls to form a sheet or film. In this case also, the resin mixture can be fiberized to some extent by stirring beforehand. Usually, one rolling of the mixture makes it difficult to perform the subsequent stretching step satisfactorily, and therefore, the mixture is passed between the rolls several times. In this case, sheets which have been pre-compressed can be superimposed and further rolled. Furthermore, since a sheet rolled in at least two directions, for example, in two directions at right angles to each other, has better strength than a sheet rolled in one direction, and facilitates the operations in the subsequent step to produce an article of better quality, it is desirable to increase the number of rolling cycles and the number of rolling directions. In summary, the number of rolling cycles will vary depending upon the condition of starting mixture. For example, when the mixture is in the form of a powder, more than 3 cycles, preferably 4 to 6 cycles, of passing will be sufficient. When the mixture is in a precompressed form, at least one passing is generally sufficient.

3. Fabrication is carried out by a combination of extrusion and rolling. A rod, slip or sheet molded by extrusion as produced in 1 is further passed between the rolls. The rolling direction may be the same as, or different from, the extrusion direction. The process of this invention is most suitably performed when the process contains a step of rolling in a direction at right angles to the extrusion direction. When the extrusion molded article is rolled, it is, of course, possible to change the rolling direction or perform rolling several times.

The unsintered fabricated article obtained by the process described above is believed to be an assembly of fine fibrous materials. The individual fibers are so finely intertwined that they cannot be separated into the constituent fibers. It is difficult to observe the structure of the fibrous mass even at a magnification of 400X. According to the method illustrated above, it is not necessary to form a sheet by processing a fibrous mass which has been spun or divided finely, in a manner to make paper or felt, but the fiberization and the fabrication of the resin mixture can be performed simultaneously.

The unsintered molded article so obtained and containing the liquid lubricant is then stretched in at least one direction. This stretching operation can be carried out while the mixture contains the lubricant, or after the lubricant has been removed by evaporation, or extraction, etc.

With evaporation the evaporation temperature varies depending upon the type of the lubricant used and in particular, upon the boiling point of the lubricant. Generally, evaporation is initiated at a temperature 50° C below the boiling point of the lubricant with a gradual elevation of the temperature. The final temperature can be 20° C above the boiling point of the lubricant.

A wide variety of organic solvents can be used for the extraction so long as they have a low boiling point. Suitable examples of solvents which can be used for extraction are hydrocarbons such as petroleum ethers, gasoline and the like, and alcohols such as ethanol. However, halogenated hydrocarbons such as carbon tetrachloride, trichloroethylene, Perclene (tetrachloroethylene), and Freons are preferred.

This stretching operation preferably is carried out after removing the lubricant. This stretching step is also most important in the present invention, and provides a structure which retains its porosity even if the article is heated at a temperature of at least about 327° C in the subsequent step. This heating strengthens and stabilizes the porous structure.

In order to obtain a porous film having thickness of not more than 0.3 mm, a pore diameter of not more than 5 microns, and an accurately controlled pore size distribution, preferably the resin mixture is stretched while maintaining the temperature of the sheet during stretching at 20° to 60° C, the absolute speed of the sheet at 1 cm/min. to 5 m/min., the stretch ratio at 10% to 300%, and the distance between the stretch rolls at 0.05 to 500 mm. In order to obtain a porous film having a thickness of at least 0.3 mm, preferably, the temperature of the sheet is maintained during stretching at 20° to 100° C, the absolute speed of the sheet at 7 cm/min. to 20 m/min., the stretch ratio at 100% to 900%, and distance between the stretch rolls at 0.5 to 500 mm. Changes in the preferred stretching conditions depending on the desired thickness of the film are required because the surface layer of the unsintered molded article is fibrous, while surprisingly, the inner layer of the unsintered molded article is fiberized to a lesser extent. On the other hand, during stretching, fiberization proceeds not only on the surface layer of the unsintered molded article but also in the inner layer.

It is important in this invention to control the extent of fiberization in the thickness direction within a certain range. Promotion of the fiberization can be achieved by increasing the stretching temperature of the sheet, the absolute speed of the sheet and the roll rotating ratio, and decreasing the distance between the stretch rolls. However, under stretching conditions which bring about complete fiberization of the surface and the inner portion of the unsintered molded article, heating at a temperature of at least about 327° C results in a distribution of portions having a great degree of shrinkage and portions having only a small degree of shrinkage, and the $+3\delta$ diameter becomes greater than twice the mean diameter to produce a product having a broad pore size distribution only.

It is possible to grip two opposing sides of the molded article and stretch the article so as to increase the distance between the two sides. Stretching also can be accomplished by winding a sheet wound on one spindle, onto another spindle at a windup speed higher than the feed speed. Alternatively, a sheet which has been stretched in one direction is elongated in a direction at right angles to the initial stretching direction. Further, a sheet can be stretched simultaneously in two directions, or the edge of a sheet can be fixed and the center of the sheet pressed in a perpendicular direction to the sheet surface thereby to stretch the edge portion. In the case of a rod or tube, it is simple to stretch the rod or tube in its longitudinal direction. These examples have been given for illustrative purposes and are not intended to limit the method of this invention.

Preferably, the above stretching step is carried out by varying the rotating speeds of two rolls, and under the following conditions. The temperature of the sheet during stretching is maintained at 20° to 100° C, and the absolute speed of the sheet at 1 cm/min to 20 m/min. The stretch ratio is within 10 to 900% of the original length, and is controlled by maintaining the stretch roll rotating ratio at 1:1.1 to 1:10 and the distance between the stretch rolls at 0.05 to 500 mm. Unless all of these conditions are met, a product having the desired pore size distribution cannot be obtained.

When the fiberization of the inner layer is insufficient although the surface layer has been fiberized to a great extent, the resulting structure comprises a surface layer having a high porosity and an inner layer having a low porosity with the pores being partially melt-adhered due to the expansion of the structure upon heating to at least about 327° C. Thus, it is impossible to obtain a porous film having an accurately controlled pore size distribution.

If the temperature of the molded article to be heated is increased to at least about 327° C, the heating can be completed in about several minutes. Actually, however, a certain period of time is required to increase the temperature of the means for supporting the material to be stretched, and therefore, heating sometimes must be carried out for about 10 minutes when stretch supporting means of a thin metal sheet are used, or for more than 30 minutes when stretch supporting means of large size are used. Usually, this heat treatment is carried out in an oven and the temperature employed can be up to the decomposition temperature of about 470° C, preferably at 350° to 400° C. Use of temperatures of less than 350° C, e.g., 327° C to 350° C are greater than 400° C, e.g., 400° to 470° C, are suitable but not preferred because the heating time is prolonged in the former case and the heating time is too short in the latter case which can result in difficulties in processing control. The heating time varies depending upon the temperature used in the heating, but generally can range from 1 minute to about 3 hours. More specifically, the heating time ranges from 20 minutes to 3 hours at a temperature in the range of from 327° to 350° C and from 1 minute to 20 minutes at a temperature of from 350° to 470° C.

It is desirable to fix both ends of the material in the stretch direction during heating, or to place the material along the surface of a drum during heating. When the material is fixed in the stretching direction but not in other directions, for example, in a direction at right angles to the stretching direction, the stretching effect is sometimes lost because of a larger shrinkage of the material in the other directions. In this case, the material is desirably fixed lightly even in these directions.

Heating the molded article continuously to a temperature of at least about 327° C to sinter it, another object of this invention, cannot be achieved by the above process. In order to accomplish this, the unsintered sheet should be adhered to the cooling roll side of a mirror-surface endless belt supported between a heating roll and a cooling roll, and be peeled off from the belt on the opposite side.

One embodiment of an apparatus suitable for performing the heating and sintering step of this invention is shown in the FIGURE. In the drawing, the reference numeral 1 represents a heating roll capable of being heated internally or externally; 2, a cooling roll usually capable of being cooled internally; 3, a mirror-surface polished endless belt, for example, of stainless steel, and rotating over the heating roll 1 and the cooling roll 2; 4, a heat insulation over for preventing the dissipation of heat from the heating roll; 5, an auxiliary roll for urging the unsintered polytetrafluoroethylene sheet S against the stainless steel endless belt; and 6, an auxiliary roll for peeling off the sheet. The two auxiliary rolls are provided in proximity to the endless belt on the cooling roll side.

In operation, the unsintered polytetrafluoroethylene sheet obtained by the process described hereinabove is urged against the endless belt surface 3 by the auxiliary roll 5 at room temperature or at a temperature of preferably not more than 100° C, e.g., a temperature less than about 150° C, preferably 20° C to 100° C and by this urging, the sheet adhered to the belt revolves in this state and reaches the heating roll 1 where it is heated to a temperature of at least about 327° C. It is of utmost importance to adhere the unsintered sheet to the belt on the cooling roll side. If it is directly adhered to the high temperature roll, the polytetrafluoroethylene sheet is greatly elongated and shrunken, and a porous sintered sheet having a uniform thickness cannot be obtained. In particular, the variation of pore diameters is great, and variation also occurs in the stretch ratio. When the sheet is adhered to the belt on the cooling roll side, that is at a temperature of preferably not more than 100° C, such a variation is very small. The use of a mirror-surface polished endless belt is for the purpose of uniformly adhereing the sheet to the endless belt and peeling off the sheet smoothly from the endless belt.

The heated and sintered sheet thus obtained can be peeled off effectively by means of the auxiliary roll 6 on the opposite cooling roll side. If the sheet is peeled off at a high temperature, the sheet is stretched, and a uniform sintered sheet cannot be obtained. In particular, in the case of a stretched sheet, variation in the stretch ratio or the poore diameter occurs. Accordingly, the sheet should be removed from the belt at a temperature of not more than 100° C.

The following Examples illustrate the present invention in greater detail. It should be understood that these Examples are not to be construed to limit the present invention in any way. Unless otherwise indicated, all parts, percents, ratios and the like are by weight.

EXAMPLE 1

1,000 g of Polyflon F 103 (tradename for unsintered polytetrafluoroethylene powder having a molecular weight of about 2,700,000, the product of Daikin Kogyo Kabushiki Kaisha) and 200 g of a petroleum fraction having a boiling point of about 150° to 250° C were placed in a sealed vessel, and were uniformly mixed by rotating the vessel.

The mixture obtained was extruded through a ram-type extruder to form a strip having a thickness of 6 mm and a width of 100 mm. The strip was rolled in the same direction as the extruding direction and a direction at right angles to the extruding direction using a calender roll to form a 0.05 mm thick sheet. The sheet was extracted with trichloroethylene to remove the petroleum fraction, and then dried.

Both ends of the drid sheet were fixed to a stationary frame, and stretched in two directions at a fixed frame speed of 50 cm/min. in an atmosphere held at 30° C. The stretching was stopped when the stretching was 50%. The sheet was then brought into intimate contact with the surface of a chromium-plated drum, and sintered at 350° C for 45 minutes to form a sheet having a thickness of 0.025 mm.

The pore diameter distribution determined by ASTM-D-2496-66T method using the surface tension of the liquid was as follows: a mean pore diameter 0.45 $\mu$, a maximum pore diameter 0.67 $\mu$, a mean pore diameter 0.2 $\mu$.

The process described above makes it possible to form a porous film of polytetrafluoroethylene having a thickness as small as not more than 0.1 mm which has been difficult to obtain by conventional processes. Also, a porous film having a thickness of more than 0.3 mm with a $+3\delta$ diameter of not more than 2 times the mean diameter can be easily obtained. Furthermore, it is possible to produce these films continuously. A porous film having such a superior pore size distribution can be used as a membrane filter for cleaning solutions or separating slags. It finds application involving contact with strong acids such as hydrofluoric acid, hydrogen fluoride, sulfuric acid or nitric acid or mixed acids such as aqua regia, strong alkalis such as sodium hydroxide, potassium hydroxide or ammonia or solvents such as acetone or cresol such as filtration in which filtration has previously been impossible or only with difficulty. Because of its superior thermal stability and chemical resistance, this porous film is not attacked by nascent chlorine or concentrated sodium hydroxide, and is especially effective as a diaphragm for electrolysis of sodium chloride. The porous film is also useful in fields utilizing the water-repelling property of polytetrafluoroethylene and air-permeability of the porous film, for example, as a filter of an instrument for measuring gases dissolved in water or as a respiratory membrane.

EXAMPLE 2

A dried sheet obtained under the same conditions as described in Example 1 was stretched in the same direction as the final rolling direction at a stretching temperature of 20° C. The absolute speed of the sheet during stretching was maintained at 1 cm/min. The distance between the stretch rolls (the distance between the rolls having different rotating speeds) was maintained at 200 mm. The roll rotating ratio was 1:2.5; namely, the stretch ratio was 150%. The resulting stretched sheet was continuously fed to a sintering apparatus of the type shown in the FIGURE and sintered. The heating roll 1 was heated using an infrared heater contained in the heating roll. The surface of the roll was plated with chromium, and the mixture surface temperature was 450° C. The difference in temperature in the width direction o2 was capable of being internally cooled with water, and its peripheral surface was chromium plated and maintained at a temperature of not more than 100° C. The mirror-surface polished endless belt 3 was stretched over the heating roll 1 and the cooling roll 2, and was made of stainless steel (SUS-27). The auxiliary roll 5, was a rubber roll to bring the unsintered stretched sheet into intimate contact with the endless belt on the cooling roll side, and the auxiliary roll 6 was made of a metal or rubber and adapted to continuously remove the sheet sintered at least about 327° C on the heating roll. The endless belt 3 was maintained taut by moving the cooling roll 2 downwardly, and rotated at a peripheral speed of 1 cm/min. to 5 m/min. This method makes it possible to sinter the sheet continuously for prolonged periods of time, and the more characteristics of the stretched sheet were uniformly maintained. The more size distribution of the resulting sheet, as determined by ASTM-D-2496-66T, was substantially normal with a mean pore diameter of 1.2 $\mu$, a maximum pore diameter of 1.4 $\mu$, and a minimum pore diameter of 0.8 $\mu$. The porosity of the sintered sheet was 60%, and the air permeability of the sheet was 9 seconds/100 ml air inch$^2$ cm Hg. Scarcely any variation in the pore characteristics in the longitudinal direction of the sheet were observed, and a long porous film having uniformly controlled pore characteristics could be obtained.

EXAMPLES 3 TO 7

A dried sheet obtained under substantially the same conditions as described in Example 1 was stretched in the same direction as the final rolling direction using a uniaxial roll stretcher. The sintering apparatus utilized an endless belt just as described in Example 2. The thickness of the sheet before stretching, the stretching temperature, the stretching speed, the stretch ratio, and the distance between stretch rolls were varied as shown in Table 1. The resulting sintered sheets had the properties shown in Table 1.

Table 1

| Example | Thickness of Sheet Before Stretching (mm) | Temp. (°C) | Speed (cm/min.) | Ratio | Distance Between Rolls (mm) | Pore Diameter Mean (μ) | Pore Diameter Max. (μ) | Pore Diameter Min. (μ) | Air Permi-ability (*) | Porosity (%) |
| --- | --- | --- | --- | --- | --- | --- | --- | --- | --- | --- |
| 3 | 0.05 | 20 | 1 | 30% | 0.08 | 0.2 | 0.22 | 0.16 | 450 | 28 |
| 4 | 0.4 | 90 | 10 | 300% | 500 | 3.0 | 4.2 | 2.1 | 3 | 75 |
| 5 | 0.1 | 50 | 500 | 100% | 100 | 1.0 | 1.2 | 0.7 | 20 | 53 |
| 6 | 0.15 | 30 | 50 | 50% | 200 | 0.5 | 0.55 | 0.3 | 49 | 41 |
| 7 | 1.5 | 60 | 1000 | 600% | 500 | 2.4 | 3.5 | 1.3 | 30 | 81 |

(*) seconds/100 ml air inch²cmHg

COMPARATIVE EXAMPLES 1 TO 5

A sheet prepared under substantially the same conditions as described in Example 1 was stretched and sintered under the conditions shown in Table 2. The resulting sheets had the properties shown in Table 2. An endless belt was not used during sintering.

Table 2

| Example | Sheet Thickness Before Stretching (mm) | Temp. (°C) | Speed cm/min | Ratio | Roll Distance (mm) | Pore Diameter Mean (μ) | Pore Diameter Max. (μ) | Porosity (%) | Remarks |
| --- | --- | --- | --- | --- | --- | --- | --- | --- | --- |
| 1 | 0.1 | 150 | | 100% | 0.08 | 2.0 | 5–10 | 65 | Pin holes occurred |
| 2 | 0.1 | 40 | 1 | 100% | 1000 | 15–3 | 4–7 | 57 | Great variation in pore diameter |
| 3 | 0.1 | 20 | 600 | 100% | 0.08 | 1.5 | 2.2 | 48 | A striped pattern with a combination of portions well stretched and portions stretched poorly |
| 4 | 1.5 | 60 | 400 | 1900% | 500 | — | — | — | Not stretchable because of breakage |
| 5 | 0.7 | 90 | 2000 | 400% | 5 | 1.5–2 | 5–10 | 73 | Great periodic variation in thickness and pore diameter |

While the invention has been described in detail and with reference to specific embodients thereof, it will be apparent to one skilled in the art that various changes and modifications can be made therein without departing from the spirit and scope thereof.

What is claimed is:

1. In a process for preparing a porous film of polytetrafluoroethylene having the steps of forming an article from an unsintered polytetrafluoroethylene mixture containing a liquid lubricant; stretching the article at least uniaxially while maintaining the temperture of the sheet during stretching at below 327° C, the absolute speed of the sheet being between 1 cm/min and 20 m/min at a stretch ratio of 10 to 100% of the initial length, and then heating the article to a temperature of at least 327° C, the improvement being in said heating step and comprising, providing a moving mirror-surface endless belt positioned over a cooling roll and a heating roll, said rolls rotating whereby each portion of said belt consecutively contacts a portion of the periphery of the heating roll and the cooling, roll, urging the stretched sheet against said endless belt at a first position thereof where said belt is in contact with said cooling roll, peeling off the sheet from said endless belt at a second position thereof where said belt is in contact with said cooling roll, said second position being downstream from said first position in the direction of movement of said belt and being separated therefrom by the path of said belt around a portion of the periphery of said heating roll, whereby said stretched sheet adhered to said belt passes over said heating roll for continuous sintering between adhering to and peeling from said endless belt.

2. The process of claim 1, wherein the stretching is conducted using rolls while maintaining the rotating ratio of the stretch rolls at 1 : 1.1 to 1 : 10 and the distance between the rolls at 0.05 to 500 mm.

3. The process of claim 1 wherein the liquid lubricant is removed from the polytetrafluoroethylene article prior to the stretching step.

4. The process of claim 1 wherein the article of polytetrafluoroethylene is formed by extrusion.

5. The process of claim 1 wherein the article of polytetrafluoroethylene is formed by rolling.

6. The process of claim 1 wherein the article of polytetrafluoroethylene is formed by extruding and rolling.

7. A porous film of polytetrafluoroethylene produced by the process set forth in claim 1.

8. A porous film of polytetrafluoroethylene produced by the process as set forth in claim 2.

9. A porous film of polytetrafluoroethylene produced by the process set forth in claim 3.

10. A porous film of polytetrafluoroethylene produced by the process set forth in claim 4.

UNITED STATES PATENT AND TRADEMARK OFFICE
CERTIFICATE OF CORRECTION

PATENT NO. : 4,049,589
DATED : September 20, 1977
INVENTOR(S) : ISAMU SAKANE

It is certified that error appears in the above–identified patent and that said Letters Patent are hereby corrected as shown below:

Column 9, Line 51, delete 100% and insert --1000%--.

Signed and Sealed this

Eighteenth Day of December 1979

[SEAL]

Attest:

SIDNEY A. DIAMOND

Attesting Officer          Commissioner of Patents and Trademarks